UNITED STATES PATENT OFFICE.

ROBERT E. ROGERS, OF PHILADELPHIA, PENNSYLVANIA.

IMPROVEMENT IN METHODS OF RECOVERING NITRIC ACID USED IN SEPARATING GOLD AND SILVER.

Specification forming part of Letters Patent No. 176,813, dated May 2, 1876; application filed March 17, 1876.

*To all whom it may concern:*

Be it known that I, ROBERT E. ROGERS, of Philadelphia, Pennsylvania, have invented a method of recovering the nitric acid usually lost in refining or parting gold and silver, of which invention the following is a specification:

In the ordinary process of parting gold and silver, by the use of nitric acid, the mixed metals are first treated with that acid, whereby nitrate of silver, and, if copper be present, the nitrate of copper are formed and the gold is left undissolved. The mixed solution of nitrate of silver and nitrate of copper is next treated with common salt, (chloride of sodium,) whereby the chloride of silver is precipitated and the nitrate of sodium formed, the last-named substance remaining in solution. When the chloride of silver has settled, the nitrate of sodium is drawn off as a waste product, and the chloride of silver, having been transferred to filters, is thoroughly washed. In these operations it is seen that the whole of the nitric acid, which was previously combined with the silver, and now transferred to the sodium, is thrown away as a waste product.

The object of my invention is to recover the nitric acid so lost, as well as that usually lost in other processes where the nitrate of silver is precipitated by common salt. This I accomplish in the following manner:

The solution of nitrate of silver or the mixed solution of nitrate of silver and nitrate of copper, if the latter be present, is transferred to deep tanks, the depth of which is considerably greater than their width. To the nitrate-of-silver solution, instead of adding common salt, (chloride of sodium,) I add hydrochloric acid, (muriatic acid.) This acid precipitates the silver as a chloride of silver, and liberates the nitric acid. Violent stirring is performed both during and after the addition of the hydrochloric acid, whereby, upon repose, the chloride of silver settles into a dense mass, forming, comparatively, a small depth. The supernatant solution of nitric acid is decanted, and, on settling or filtration, is in a condition ready to be employed again in parting a fresh amount of gold and silver bullion, and this operation can be repeated over and over again, until the nitric acid recovered becomes so charged with copper and other impurities as to be unavailable; or, instead of thus using the recovered acid over and over, in its impure form, it may be distilled by the ordinary methods of distilling nitric acid, and thus rendered pure.

In the application of the process described, care is to be taken to add the hydrochloric acid to the nitrate-of-silver solution in such quantities as not to have an excess of hydrochloric acid, (since free hydrochloric acid dissolves to a small extent the chloride of silver, and would cause its loss,) but to leave a small amount of nitrate of silver in solution unprecipitated.

If, by accident, an excess of hydrochloric acid shall have been used, it is only necessary to throw in a sufficient amount of nitrate of silver to remove that hydrochloric acid, and to leave a small excess of the silver solution. It is a very simple and easy matter to ascertain whether the hydrochloric acid or the nitrate of silver is in excess by a test solution of nitrate of silver on the one hand and of chloride of sodium on the other.

After drawing off the nitric acid from the precipitated chloride of silver, it is necessary to add to that precipitated chloride of silver a sufficient amount of common salt (chloride of sodium) to throw down the small amount of silver contained in the nitrate of silver mingled throughout the pulpy chloride of silver.

It is not necessary to use chemically-pure hydrochloric acid, since the ordinary commercial muriatic acid answers the purpose.

I do not confine myself to the use of liquid hydrochloric acid, which is hydrochloric-acid gas absorbed by water, (commercially known as muriatic acid,) although I prefer the same; but I can use the hydrochloric-acid gas without first causing its absorption by water, whereby, as in case of the liquid acid, the chloride of silver is precipitated, and nitric acid is set free.

In all cases, in the use of hydrochloric acid, whether liquid or gaseous, it is important to agitate vigorously the mixture both during and for a short time after chemical action.

I claim—

The method herein described for the recovery of nitric acid from nitrate-of-silver solutions by the employment of hydrochloric acid, either in the liquid or gaseous form, in the parting or refining of gold and silver, substantially as set forth.

ROBERT E. ROGERS.

Witnesses:
J. E. SHAW,
THOS. A. BARTT.